United States Patent

[11] 3,568,643

| [72] | Inventor | Lon H. Wessinger |
| | | 439 Longview St., Carrollton, Ga. 30117 |
| [21] | Appl. No. | 801,507 |
| [22] | Filed | Feb. 24, 1969 |
| [45] | Patented | Mar. 9, 1971 |

[54] POULTRY-HANDLING SYSTEM
7 Claims, 10 Drawing Figs.

[52] U.S. Cl. .................................................. 119/82, 43/6.5
[51] Int. Cl. .................................................. A10k 29/00
[50] Field of Search .................................................. 119/82, 159, 156; 302/21, 25, 40, 41, 17; 43/6.5

[56] References Cited
UNITED STATES PATENTS

| 1,361,691 | 12/1920 | Davis | 43/6.5 |
| 3,273,276 | 9/1966 | Englesson | 43/6.5 |
| 3,421,245 | 1/1969 | Lerch | 43/6.5 |
| 275,969 | 4/1883 | Woodside | 119/45X |
| 1,471,927 | 10/1923 | Schutt et al. | 302/17 |
| 1,603,053 | 10/1926 | Leffler | 119/156 |
| 1,686,099 | 10/1928 | Miller | 119/45X |
| 1,798,061 | 3/1931 | Brost | 302/21 |
| 2,840,041 | 6/1958 | Fleming | 119/82 |
| 3,027,871 | 4/1962 | Peterson | 119/45 |
| 3,186,769 | 6/1965 | Howlett, Jr. | 302/25X |
| 3,244,359 | 4/1966 | Holland | 119/17X |
| 3,279,432 | 10/1966 | Forstmaier et al. | 119/15 |

*Primary Examiner*—Aldrich F. Medbery
*Attorney*—John Howard Joynt

ABSTRACT: Method and apparatus for handling poultry by transferring the same from poultry house to processor by way of bins into which the poultry is urged for transport by a combination of suction and then air under pressure, from which bins the poultry is unloaded at the processor.

INVENTOR
LON H. WESSINGER
BY
ATTORNEY

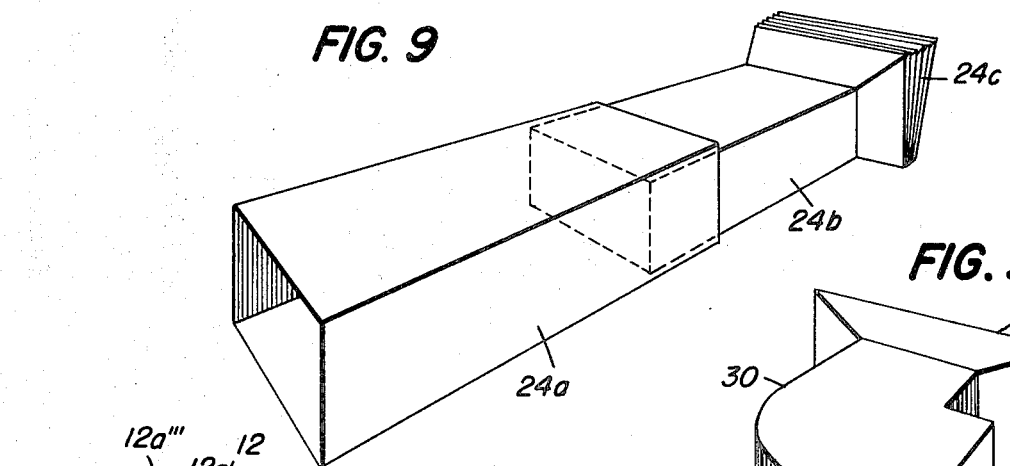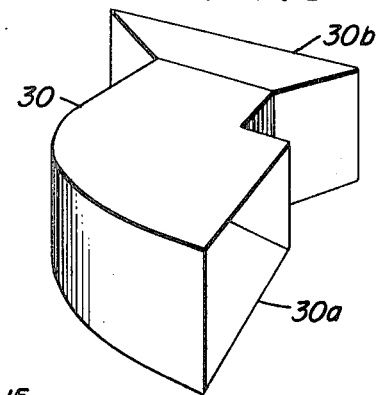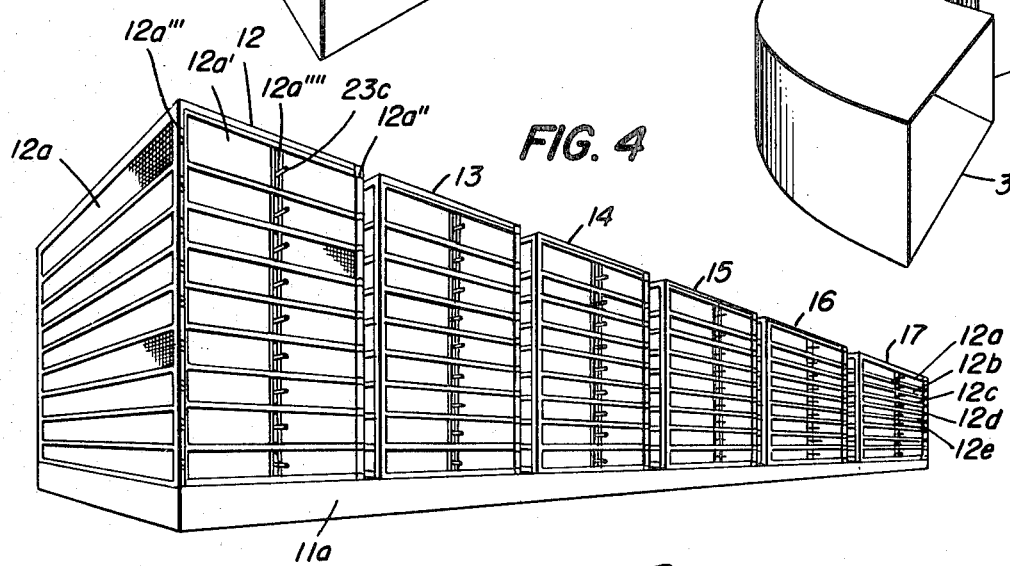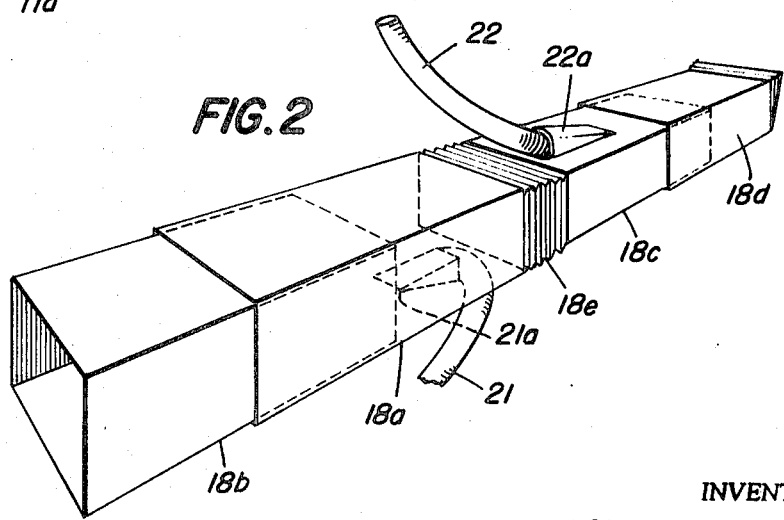

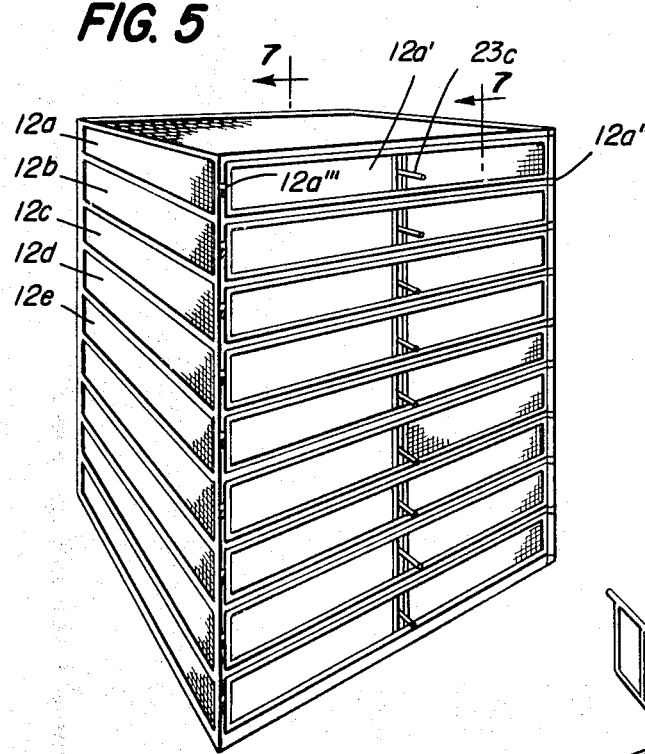
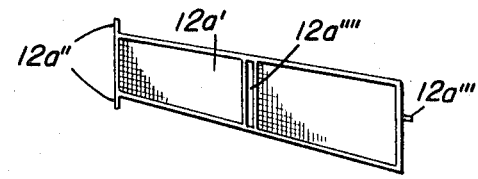
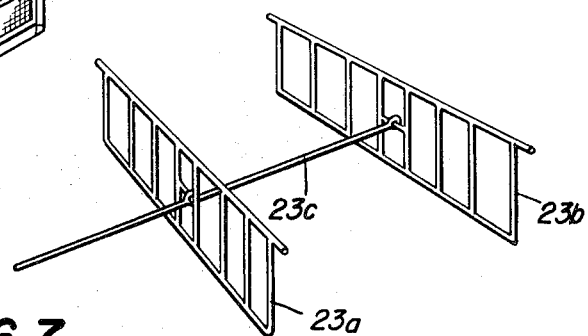
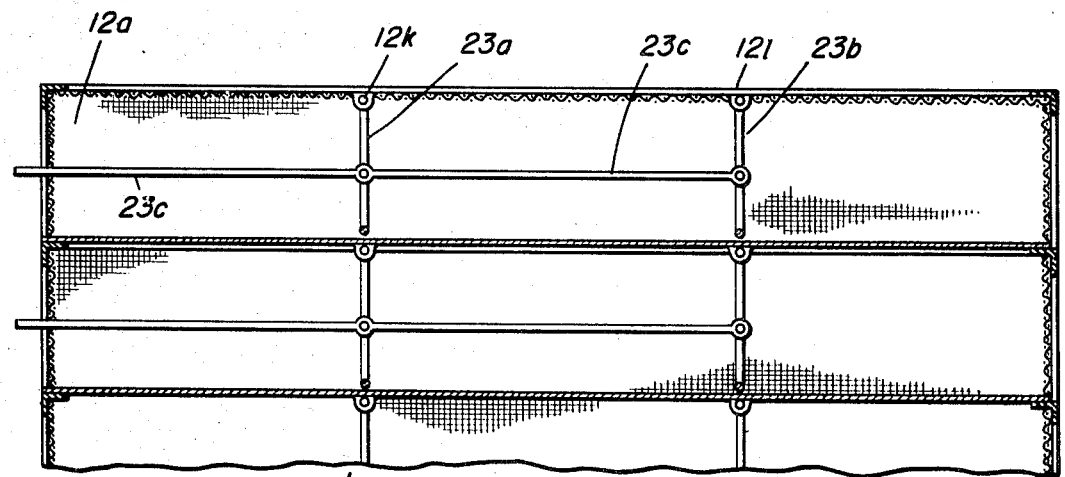
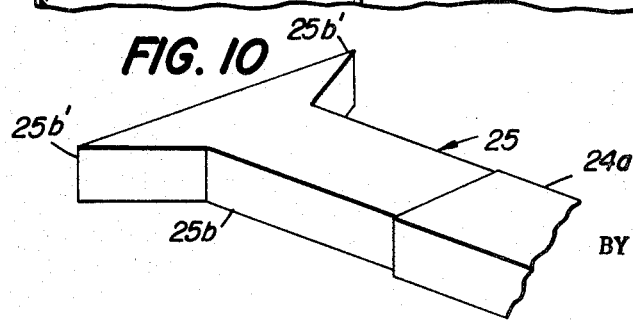
INVENTOR
LON H. WESSINGER
BY
ATTORNEY

POULTRY-HANDLING SYSTEM

As a matter of introduction, my invention is concerned with a system for handling poultry, more particularly for loading the same for transport, and subsequent unloading.

One of the objects of the invention is the provision of a method and apparatus for handling poultry, such as chickens, quail, pheasant, turkeys, and the like, especially in loading the same expeditiously and efficiently into a conveyance for transport to a processor.

Another object is the provision of a system and apparatus of the character indicated for handling poultry in which the poultry is not touched by human hands in loading, in transport, or in unloading. And in which a minimum of skilled help is required, all at minimum cost.

A further object is the provision of such a system, apparatus and method in which a minimum of damage is done to the poultry being handled, and in which loading and unloading are had with maximum efficiency with a minimum number of operators, and all with minimum consumption of time.

Further objects of my invention in part will become apparent during the course of the description which follows and in part particularly pointed to.

My invention, accordingly, may be viewed as comprising a novel combination of structural elements, arrangement of parts and interrelation between each of the same with one or more of the others, and as comprising the combination and interrelation of operational steps, all as described herein, the nature of which invention is more particularly set out in the claims at the end of this specification.

BACKGROUND OF THE INVENTION

In order to gain a better understanding of certain features of my invention, it is to be noted at this point that the poultry industry is large and extensive. It conservatively may be said to run into many millions of dollars annually. Although of high volume throughout the year, there are peak seasons, as in the spring or in the fall, when great numbers of chickens, turkeys, and the like are processed and sold and when quail, pheasants, or the like are shipped from game farm to user.

In the poultry farms throughout the southern part of the United States, a poultry house, such as for chickens, may very well have some 10,000 to 12,000 chickens ready for delivery at a particular time or season. These ordinarily are purchased by a local processor, whose obligation it is to catch the poultry, load the same into an appropriate conveyance, and transport to processing plant. At least some 10 laborers are required to catch and load the poultry, this commonly consuming some 3 or 4 hours' time. An additional 1½ to 2 hours are required to unload the poultry.

Unfortunately, particularly during the peak seasons, there is a shortage of labor, and it is difficult to find sufficient men to do the catching and loading. In many instances unskilled help must be resorted to. And in the hand catching of chickens, turkeys, or the like, some are bruised, and even some are injured, resulting in broken legs and broken wings. A few are killed in the process.

In current practices, the hand loading of poultry frequently results in breaking or otherwise damaging the commonly used wooden crates. Breakage and damage not only is had during the loading of the poultry, but also in transporting the crates to the processing plant by truck or trailer, and in subsequent unloading. The crates in current use may last only some 3 or 4 months.

An object of my invention, therefore, is to overcome the deficiencies of current practices and provide a system, apparatus and method in which poultry is caught, loaded for transport, and unloaded with a minimum of labor requirement, with maximum efficiency, and at minimum cost. And in the method, system and apparatus there is minimum damage to the fowl and to the equipment.

SUMMARY OF THE INVENTION

My invention in general may be considered to comprise a method of transferring poultry from poultry house to processing plant or purchaser in which suction is applied to the poultry in the house to urge the same into a conveying conduit, then air pressure is applied for forcing the poultry along the conduit and into a suitable conveyance-mounted bin, and finally the poultry is urged out of the bin and into the processing plant, particularly by way of air pressure.

More especially, my invention comprises a system and apparatus in which there is provided a conveyance-mounted series of individual bins, each of which is supplied with a vertical grouping of individual compartments, with a suitable conduit extending from poultry house to bin with blower system having a suction end leading into the intake side of the conduit and an exhaust end leading into the discharge side of the conduit. The blower, with operating gasoline engine, conveniently is mounted on a truck. The conduit itself is provided with a midportion with flexible coupling conveniently with the suction end of the blower on one side of the coupling and the exhaust end on the other side. And for a best ease of handling and adjustment, each end of the conduit is in the form of telescoping parts. The exhaust end of the conduit is provided with a flexible end for precisely fitting any one compartment of any one bin.

In operation, the poultry is urged from the poultry house into the conduit by way of suction, the poultry of course being generally driven into the direction of the conduit by unskilled labor. The poultry is first urged along the conduit by way of the suction provided by the blower, and then further urged by way of the air pressure coming from the blower. The poultry is exhausted from the conduit and into first one compartment and then another of a particular bin, and thence to successive compartments of the further bins. The discharge end of the conduit is easily positioned from one compartment to another, and from one bin to another, by a single operator.

The bin-mounted conveyance is driven to the processing plant, where the bins are unloaded. While unloading conveniently may be had by pushing the poultry out of the compartments by way of manual means, I find best results are achieved, with minimum poultry damage, by gently blowing them out, this by way of a blower unit at the plant with flexible hose conduit sequentially affixed at the rear of each compartment while opening the door provided at the front.

DESCRIPTION OF THE DRAWINGS

In the accompanying drawings, where there are illustrated the system and apparatus of my invention:

FIG. 2 discloses the conduit of FIG. 1, with suction and discharge connections from the blower;

FIG. 3 discloses, on somewhat enlarged scale, a fitting for the poultry house end of the conduit to allow angular parking of the conveyance at the side of the poultry house;

FIG. 4 is an elevation view disclosing an array of bins for mounting on a conveyance as in FIG. 1, six bins being indicated, each with a stack of compartments, nine being shown;

FIG. 5 discloses in perspective, on somewhat enlarged scale, one of the bins of FIG. 4;

FIG. 6 discloses in perspective the door provided on the loading and unloading side of the compartment of FIGS. 4 and 5;

FIG. 7 discloses in sectional view, and on somewhat further enlarged scale, two of the compartments of the bins of FIGS. 4 and 5;

FIG. 8 discloses in perspective the hinged dividers employed in the bins of FIG. 7;

FIG. 9 discloses a perspective view of the unloading chute or conduit; and

FIG. 10 discloses a detached perspective view of an alternate form of unloading attachment for the chute of FIG. 9.

DESCRIPTION OF THE PREFERRED EMBODIMENTS

Figure 1:
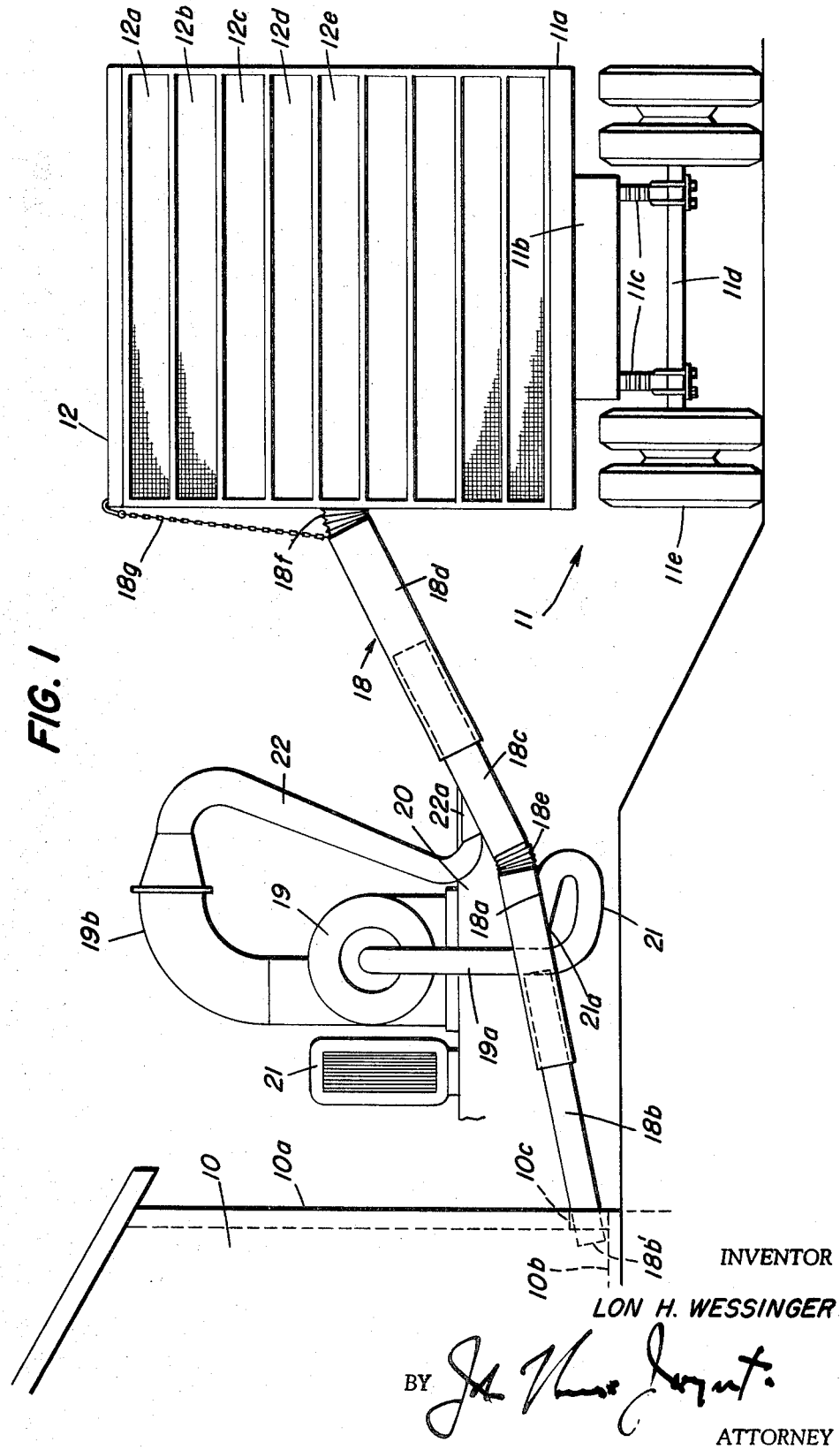
FIG. 1 discloses a rear elevation view of poultry house, conveyance-mounted bin, and interconnecting blower-operated conduit from house to bin.

Referring now more particularly to the practice of my invention, and directing attention to FIG. 1 of the drawings, I show at 10 a poultry house with sidewall 10a, floor 10b and opening in the side of the house at 10c. This serves to house the chickens, quail, pheasant, turkeys, and the like. At 11 I show a tractor-trailer with bed 11a, frame 11b, springs 11c, axle 11d and wheels 11e. Loaded onto the bed of the trailer is a bin 12, having a series of vertical compartments 12a, 12b, 12c, 12d, 12e, etc., conveniently nine in number. Bed 11a of the tractor-trailer (see FIG. 4) accommodates illustratively six bins 12, 13, 14, 15, 16 and 17. Each, of course, is provided with the series of compartments noted. The various features of bin and compartment are more fully described hereinafter, although it may be noted at this point that each bin is about 5 feet wide along the length of the trailer, about 8 feet from front to back across the width of the trailer, and about 8 feet high. The bins are spaced about 8 inches apart to provide breathing space for the poultry and, where desired, a ladder to permit visual inspection of the poultry by an operator. The compartments are about 10 inches high each and, of course, 5 feet wide and 8 feet long. Each accommodates about 100 chickens of fryer size. The floor of the compartments conveniently is fashioned of plywood, say of ⅜-inch thickness, which affords some warmth. And the sides of the compartments are of wire mesh secured to a rectangular frame, serving as the frame for the bin.

Now in the system and apparatus of my invention, I provide a loading conduit, generally shown at 18, having a first portion of telescope construction 18a and 18b, and a second portion, also of telescope construction, 18c and 18d. The two are interconnected by way of the flexible joint 18e. While a conduit of circular cross section may be employed, I feel that for best results a conduit of rectangular section accommodates more poultry, and at a faster rate. The size of the section is about 30 inches wide by 10 inches high. The loading conduit is about 26 feet long when fully extended.

The telescope part 18b of the conduit conveniently is adjusted to fit within poultry house 10, this by way of the opening 10c. Where desired, as an alternate form of construction to permit closer parking of the tractor-trailer to the poultry house, I provide attachment 30 (see FIG. 3) with one end 30a adapted to fit telescopic part 18b of conduit 18, and the opposite end, set at an angle and flared as at 30b, adapted to cover the opening 10c of the poultry house.

The telescope portion 18d of the conduit conveniently is provided with a flexible endpiece 18f which is adjusted to fit the entranceway, that is, the doorway, of any desired compartment of bins 12 through 17, and is maintained in that position by way of chain support 18g. As shown in FIG. 1, the telescopic end of conduit 18 is intimately connected to the doorway of compartment 12e.

Now I provide a blower, generally shown at 19 in FIG. 1, which is conveniently mounted on bed 20 of a suitable truck, not shown. The blower itself is operated by gasoline engine 21, also mounted on the truck bed, a 50 h.p. engine being usually sufficient for the purpose. The blower is provided with a suction or intake side 19a which, by way of inlet connection 21 (see also FIG. 2), is connected to the telescopic conduit 18a. The outlet side or pressure side 19b of the blower is connected by way of passage 22 to the telescopic portion 18c of the conduit. Inlet and outlet connections for best results are flexible. Fashioned of wire and canvas construction, they are about 10 inches in diameter.

It readily will be seen that poultry approaching the open end 18b' of conduit 18 are urged into the conduit by way of suction, this until they reach the point about where the inlet or suction end of the blower is connected to the conduit, as at 21a, as seen in FIG. 2. And that just beyond that point they are blown forward through conduit 18 by way of the air pressure of the blower entering the conduit through passage 22, as at 22a. The poultry are blown out of conduit 18 at flexible end 18f and into the desired compartment of a particular bin by way of the open doorway provided. Compartment 12a (see FIG. 6) is closed by way of door 12a', having hinged end 12a" with latch 12a''' on the other end engaging the frame of bin 12 (see also FIGS. 4 and 5). A window 12a'''' is provided centrally of the door to accommodate a feature of compartment control more particularly described below.

Poultry loaded into any one of the compartments of bins 12 through 17, following a closing of doors (see FIG. 4) is restrained from crowding by way of dividers (see FIGS. 7 and 8) which are pivotally supported within the compartment. As shown at FIG. 7, two dividers 23a and 23b, pivotally supported as at 12k and 12l, respectively, of the frame portion of bin 12, illustratively for compartment 12a, are used, breaking the compartment space into three equal sections. The dividers 23a and 23b normally rest in a vertical position, closing off passage through compartment 12a, thus forming three separate areas of the compartment and impeding any passage of poultry from one area to the other. In loading the bins, that is, sequentially loading the individual compartments of each bin, the dividers are swung upwardly into a horizontal position, this for compartment 12a by way of rod 23c. A clear passage, then, is provided in the compartment, following which upon loading, the dividers are permitted to return to the vertical position and prevent undesired congestion of poultry at either end of the compartment.

With all doors of all compartments of all bins closed and latched, as shown for example in FIGS. 4 and 5, the tractor-trailer is driven to the processing plant or other point of destination. Unloading of the poultry at the plant conveniently is had by sequentially opening the doors of the compartments, swinging the compartment dividers into horizontal position to permit free passage, and urging the poultry out into the plant. I preferably provide an unloading chute 24 (see FIG. 9) which fits the open doorway of any one compartment, conveniently being hooked into position on a particular compartment of the particular bin being unloaded. The compartment door itself is about 4 feet 10 inches wide by 8 inches high. The chute conveniently is of telescopic portions 24a and 24b, with flexible end 24c fitting against the open doorway of the compartment. The unloading chute is about 30 inches wide by 10 inches high.

Where desired, the receiving end of unloading chute 24 may be provided with an alternate form of unloading attachment 25 (see FIG. 10). This is in the form of a telescopic conduit with telescoping portion 25b fitting chute 24 as at 24a. Attachment 25 is flanged outwardly as at 25b', a matter of about 5 feet, to fit against the end of the particular compartment being unloaded.

While the poultry may be manually forced out of the bins by a long stick, best results are had by way of air pressure. For this there is employed a flexible blower and a flexible hose conduit (not shown), the latter being sequentially inserted at the rear of each compartment a distance of some 3 or 4 feet to urge the poultry out of the bin and into the unloading chute. Conveniently, the conduit is of 3-inch diameter and about 10 feet long, powered by a 25 h.p. motor-blower unit.

In conclusion, it will be seen that I provide in my invention a method, system and apparatus for handling poultry in which the objects hereinbefore set forth are effectively achieved. In my system and apparatus there is had a maximum capacity for transferring poultry from poultry house to processor, or other destination, with a minimum number of operators, at minimum cost, with minimum expenditure of time, and with minimum damage to the poultry. The system and apparatus are well calculated to efficiently serve throughout a long, useful life.

Inasmuch as many embodiments may be made of my invention, and inasmuch as various changes may be made in the embodiments described above, it is to be understood that all matter herein described and/or shown in the accompanying drawings is to be taken as illustrative, and not by way of limitation.

I claim:

1. The method of transferring poultry from poultry house to a vehicle-mounted bin which comprises in combination, applying suction to said poultry to urge the same into a continuous unobstructed conveying conduit, and then applying air pressure for forcing the poultry along the said conduit and into said bin.

2. The method of transferring poultry from one station to another which comprises in combination, applying suction to said poultry to urge the same into a continuous unobstructed conveying conduit, and then applying air pressure against said poultry for forcing the poultry along the said conduit.

3. Poultry-handling system and apparatus comprising in combination, a conveying conduit for poultry, said conduit successively having a suction portion and a pressure portion spaced therefrom and being of such sectional dimension as to accommodate poultry; suction means connecting into the suction portion of said conduit for urging poultry into the suction portion of the same; and air pressure means connecting into the pressure portion of said conduit for forcing said poultry along through the pressure portion of the same and out therefrom.

4. Poultry-handling system and apparatus comprising in combination, conduit means having an inlet end and an outlet end and being of such sectional dimension as to accommodate poultry; suction means connecting with said conduit means intermediate said ends for urging poultry into the same; air pressure means connecting with said conduit means intermediate said ends and further along the same for forcing the poultry along the conduit means; and bin means for receiving the poultry from said conduit means.

5. Poultry-handling system and apparatus comprising in combination, conduit means having an inlet suction end and an outlet end and being of such section as to accommodate poultry; air blower means with suction end and pressure end; and means feeding the suction end of said blower into the conduit means intermediate said ends for urging said poultry into the same and feeding the pressure end into said conduit means at a point spaced along the same for urging said poultry along said conduit means and out therefrom.

6. Poultry-handling system and apparatus comprising in combination, conduit means having an inlet end and an outlet end and being of such section as to accommodate poultry; air blower means spaced from said conduit means and having suction end and pressure end feeding into said conduit means intermediate the ends of the same for receiving the poultry into the inlet end and urging and forcing the poultry along said conduit means; and bin means for receiving the poultry from the outlet end of said conduit means.

7. Poultry-handling system and apparatus comprising in combination, telescoping conduit means for introducing into a poultry house and being of such cross section as to accommodate poultry, further telescoping conduit means for conveyance to a bin, flexible joint means interconnecting the said two conduit means, and air blower means having a suction connection to said first conduit means on one side of said flexible joint means and a pressure connection to said second conduit means on the other side of said flexible joint means.